(12) United States Patent
Brooks et al.

(10) Patent No.: US 7,230,625 B2
(45) Date of Patent: Jun. 12, 2007

(54) MULTI-VARIABLE OPERATIONS

(75) Inventors: Robin William Brooks, Gerrards Cross (GB); John Gavin Wilson, London (GB); Richard John Thorpe, Poole (GB)

(73) Assignee: Curvaceous Software Limited, Gerrards Cross, Buckinghamshire (GB)

( * ) Notice: Subject to any disclaimer, the term of this patent is extended or adjusted under 35 U.S.C. 154(b) by 0 days.

(21) Appl. No.: 10/515,409

(22) PCT Filed: May 22, 2003

(86) PCT No.: PCT/GB03/02216

§ 371 (c)(1),
(2), (4) Date: Feb. 17, 2005

(87) PCT Pub. No.: WO03/100537

PCT Pub. Date: Dec. 4, 2003

(65) Prior Publication Data

US 2005/0128199 A1    Jun. 16, 2005

(30) Foreign Application Priority Data

May 23, 2002  (GB) ................................ 0211836.2

(51) Int. Cl.
*G06T 11/00*  (2006.01)
(52) U.S. Cl. .................................... 345/440
(58) Field of Classification Search ................ 345/440
See application file for complete search history.

(56) References Cited

U.S. PATENT DOCUMENTS 5,245,871 A    9/1993  Henneuse et al.

FOREIGN PATENT DOCUMENTS

| EP | 0 753 283 | 1/1997 |
|---|---|---|
| GB | 2363647 | 1/2002 |
| GB | 2378527 | 2/2003 |
| WO | WO 01/38831 | 5/2001 |

OTHER PUBLICATIONS

Inselberg et al., "Parallel coordinates: survey of recent results", 1993, SPIE vol. 1913, pp. 582-599.*

* cited by examiner

*Primary Examiner*—Almis R. Jankus
(74) *Attorney, Agent, or Firm*—Davis & Bujold, P.L.L.C.

(57) ABSTRACT

Operation of a multi-variable drilling-rig is carried out within an envelope defined by convex hulls (TC,BC) that are derived from sets of historical values for the variables accumulated in a store (3) from previous operations. A display unit (5) shows the real-time values (Q01–Q10) of the variables on parallel axes (X01–X10) together with upper and lower limits (Up01–Up10, Lp01–Lp10) of the viable ranges for each variable to remain within the envelope, taking into account the current value of each other variable. The adjustment of the value of a variable (Q03) required to correct for a variable (Q08) found to be outside its viable range, is determined tentatively before implementation, by adjusting that value in the display to bring about re-calculation and display of the changes in viable ranges that would result from such adjustment.

14 Claims, 5 Drawing Sheets

MULTI-VARIABLE OPERATIONS

This application is a National Stage Completion of PCT/BG03/02216 filed May 22, 2003 which in turn claims priority from British Patent Application Serial No. 0211836.2 filed May 23, 2002.

FIELD OF THE INVENTION

This invention relates to multi-variable operations.

The invention is particularly concerned with methods and systems of operating a controllable multi-variable process.

SUMMARY OF THE INVENTION

According to one aspect of the present invention a method of operating a controllable multi-variable process, comprises deriving a multi-dimensional display representation of the variables according to individual coordinate axes, defining bounds or envelopes for prospective operation of the process, said bounds or envelopes being defined in accordance with sets of values for the process-variables accumulated respectively from previous multiple operations of the process, indicating current values of the process-variables on their respective axes of the display representation, calculating for each variable according to the current values of the other variables a viable range of values for that individual variable consistent with operation of the process within said bounds or envelopes, demarcating the calculated viable ranges of the process-variables on their respective axes of the display representation, detecting the condition in which the current value of any said variable is outside the viable range calculated for that variable, and responding to said condition to adjust the value of one or more of the variables towards maintaining the current values of all said variables within their respective viable ranges.

The definition of the bounds or envelopes for prospective operation of the process may be carried out, for example, by reference to convex hulls calculated for respective pairs of the variables using the values accumulated for them from the sets of previous multiple operations of the process. A convex hull in orthogonal coordinates is a closed polygon that encloses all relevant data points of the two-dimensional space, whereas in parallel coordinates it is a pair of spaced linear curves that as between corresponding parallel axes bound the region occupied by the lines that represent (in the parallel-coordinate space) those data points. A feature of convex hulls used in the present invention is that when the value of one variable is fixed a range of values from maximum to minimum of the others can be derived.

The invention may be applied to assist the monitoring and optimisation of processes such as the drilling or boring of holes or shafts in the earth, and in this respect may, for example, be applied in the oil and water industries in connection with the mining of oil, gas and water. More especially, the invention is applicable to ensuring safe and efficient operation of the process, in particular by providing a multi-dimensional display representation in which current values of some or all of the relevant variables are indicated on individual coordinate axes together with the limits which are applicable to them for maintaining operation of the process within defined envelopes based on previous operations of the process. The relevant limits may be indicated in demarcation of the calculated viable ranges of the variables, so that an operator may take appropriate action to adjust the value of one or more of the variables to correct deviation of the value of any of the variables outside the indicated limits.

The operator may be assisted in taking appropriate action by a facility that allows the operator to make tentative changes to the values of one or more of the variables. More especially, adjustment of the value of one or more of the variables towards maintaining the current values of all said variables within their respective viable ranges, may include a preliminary step of tentative adjustment within the display representation of the values of the one or more variables from the current values thereof and calculation of the viable ranges that would apply to the respective variables if that adjustment were made.

According to another aspect of the present invention a system for use in the operation of a controllable multi-variable process, comprises means for deriving a multi-dimensional display representation of the variables according to individual coordinate axes, means for defining bounds or envelopes for prospective operation of the process, said bounds or envelopes being defined in accordance with sets of values for the process-variables accumulated respectively from previous multiple operations of the process, means responsive to input signals in accordance with current values of the process-variables for indicating the current values of the variables on their respective axes of the display representation, calculating means for calculating, for each variable according to the current values of the other variables, a viable range of values for that individual variable consistent with operation of the process within said bounds or envelopes, the calculated viable ranges of the process-variables being demarcated on their respective axes of the display representation, and means operable for defining tentative change from the current values of a selected one or more of the variables, said calculating means being responsive to the tentative change so defined for calculating the viable ranges as aforesaid that would be applicable in the event of implementation of said change, for demarcation on the respective axes.

Where the invention is applied to assist drilling operations, the advantage of existing drilling-process measurements can be taken to provide the well-drill operator with new information in a form which will guide him/her to achieve improved and faster hole-drilling. The operator is most effectively and efficiently afforded the experience of earlier drillings, such that his/her performance in directing the drilling process can be greatly enhanced. In this regard, the operator may be assisted in the time-varying and depth-dependent drilling task, by updating the envelope of normal operation from the most-recent drilling activity either periodically or when an alarm-activity monitor indicates that conditions have changed (for example in geological conditions at the bottom of the hole). The accumulated sets of values used for defining the bounds or envelopes of the individual variables, may be changed during the course of operation for other sets of values accumulated respectively from the previous multiple operations of the process. Different modes of drilling, use of different drill bits, insertion of a drill-string into a hole or withdrawal of it, may be handled individually with their own respective operating envelopes.

BRIEF DESCRIPTION OF THE DRAWINGS

A method and system according to the present invention will now be described, by way of example, with reference to the accompanying drawings, in which.

DETAILED DESCRIPTION OF THE PREFERRED EMBODIMENTS

An example of the method and system to be described enables a drilling-rig operator to drill faster and for longer. In particular, it enables the operator to maintain the best possible rate of increase of bore depth without leading to an unstable hole or damage to the drill bit, and to avoid unplanned interruptions to drilling arising from events such as pack-off (partial hole collapse). These benefits are achieved by deriving the current values of drilling variables from the real-time data-collection system of the rig, and displaying to the operator continuously in respect of each variable, the leeway for change of value that is available consistent with maintaining acceptable or 'good' drilling. If any of the current values are not in accordance with 'good' drilling, the operator can obtain guidance on the changes to the variables under his control, required by way of correction. The operator is also warned through the display of the likely onset of an undesirable event (such as pack-off), so that corrective and/or remedial action can be taken.

In the context of description of the present specific example, it will be assumed that there are twelve variables involved in the drilling operation (the particular variables concerned, and the number of them, used in any implementation of the invention is subject to selection and may clearly be different from what is described in this example). Of these, three real-time variables forming a first group, are directly controllable by the operator, being rotational speed (revolutions per minute) of the drill-bit, mud-flow rate and hook load (used to adjust the weight on the drill-bit). Seven real-time variables forming a second group are not controllable directly, being torque on the drill string, weight on the drill-bit, back pressure on the mud-pump, gas level, hole depth, change of hole depth since last measurement, and rate of progress. The other two variables, forming a third group, are mud-circulating density and mud-solids content; their values are determined after the event, being dependent on the outcome of using the values of the other two groups of variables.

Figure 1:
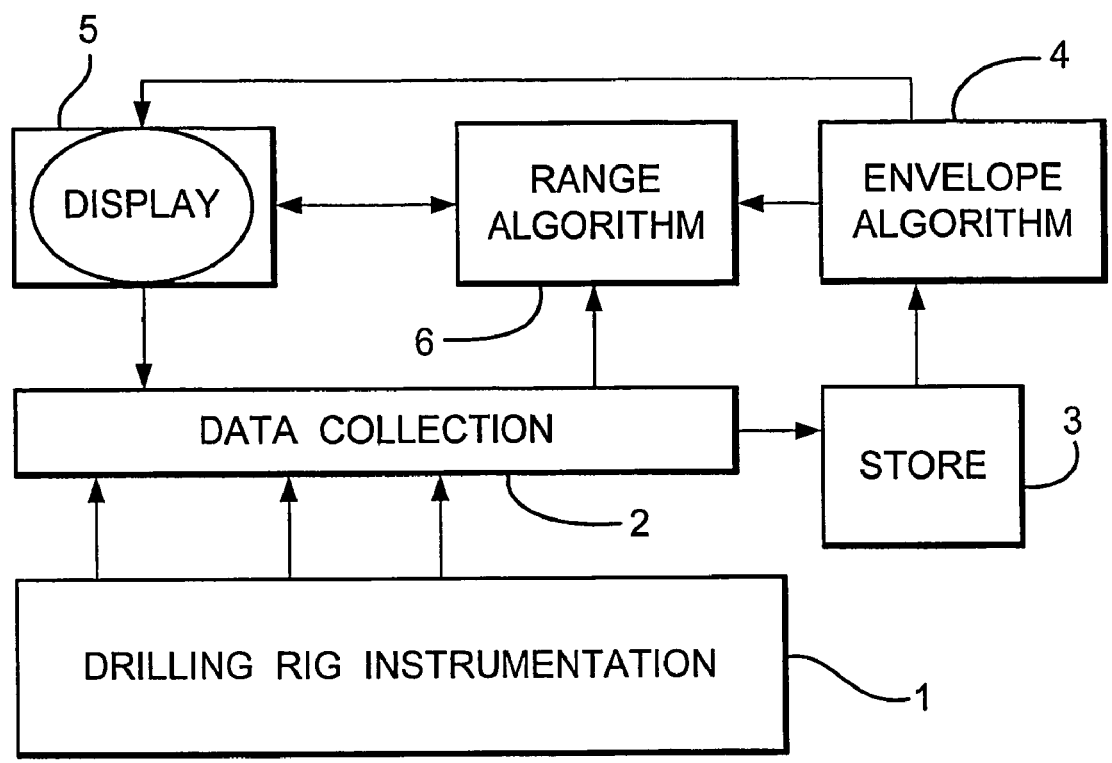
FIG. 1 is a schematic representation of a system according to the invention for use on an oil-drilling rig for detecting, advising and responding to changes occurring during drilling.

Referring to FIG. 1, values of the twelve variables of the three groups are supplied from the drilling-rig instrumentation 1, and are all sampled together periodically by a data collection unit 2 for writing into a store 3. The sample-values of the first and second real-time groups of variables are written into the store 3 marked according to the time of sampling and in sequence with the values of other samplings of those same ten variables. The values of the third group of variables are acquired by an analysis unit (not shown) and written into the store 3 in association with the samples from the first and second groups to which they relate. The store 3 accordingly accumulates a combination of values for the twelve variables applicable to each sampling or data point.

As drilling progresses, a multiplicity of combinations of values of the twelve variables are accumulated in sequence from successive samplings, so as to result in the build up of an historical record of data points (each of twelve dimensions) in the store 3. This record is used to assist choice of the values of the variables of the first and second groups appropriate to achieve successful drilling. For this purpose, the operator selects from the historical record a subset of data points that relate to successful drilling operation carried out in circumstances comparable with those of the current operation. The selection is made according to criteria set by the operator and may be adjusted in keeping with changes in the mode of drilling as the operation progresses.

The values of each variable of the selected subset, after being scaled to the range 0 to 1, are processed in a unit 4 to calculate from the data points represented, an operations envelope for display in an electronic display unit 5. The calculated envelope is a closed shape (desirably the smallest) in as many dimensions as there are real-time variables (in this case ten) which encloses all the data points of the selected subset. As displayed by the unit 5, the envelope defines in relation to the ten real-time variables, a zone within which data points appropriate to successful drilling can be expected to lie; this is nominally the best operating zone or 'BOZ'.

The BOZ envelope is calculated in this example by determining the convex hulls that are applicable between the ten variables of the first and second groups taken in pairs, and is displayed by the unit 5 within a field of ten equally-spaced parallel axes identified respectively with the ten real-time variables (the first and second groups). The convex hulls for the pairs of adjacent axes of the parallel-axis system, but for no others, are shown in the display, and the current values of the first and second groups of variables (namely of those variables that are controllable directly and those that are not) are plotted on their respective axes. In the latter respect, the current values of the variables of the first and second groups are passed from the data collection unit 2 via a unit 6 for supply to the display unit 5.

Figure 2:
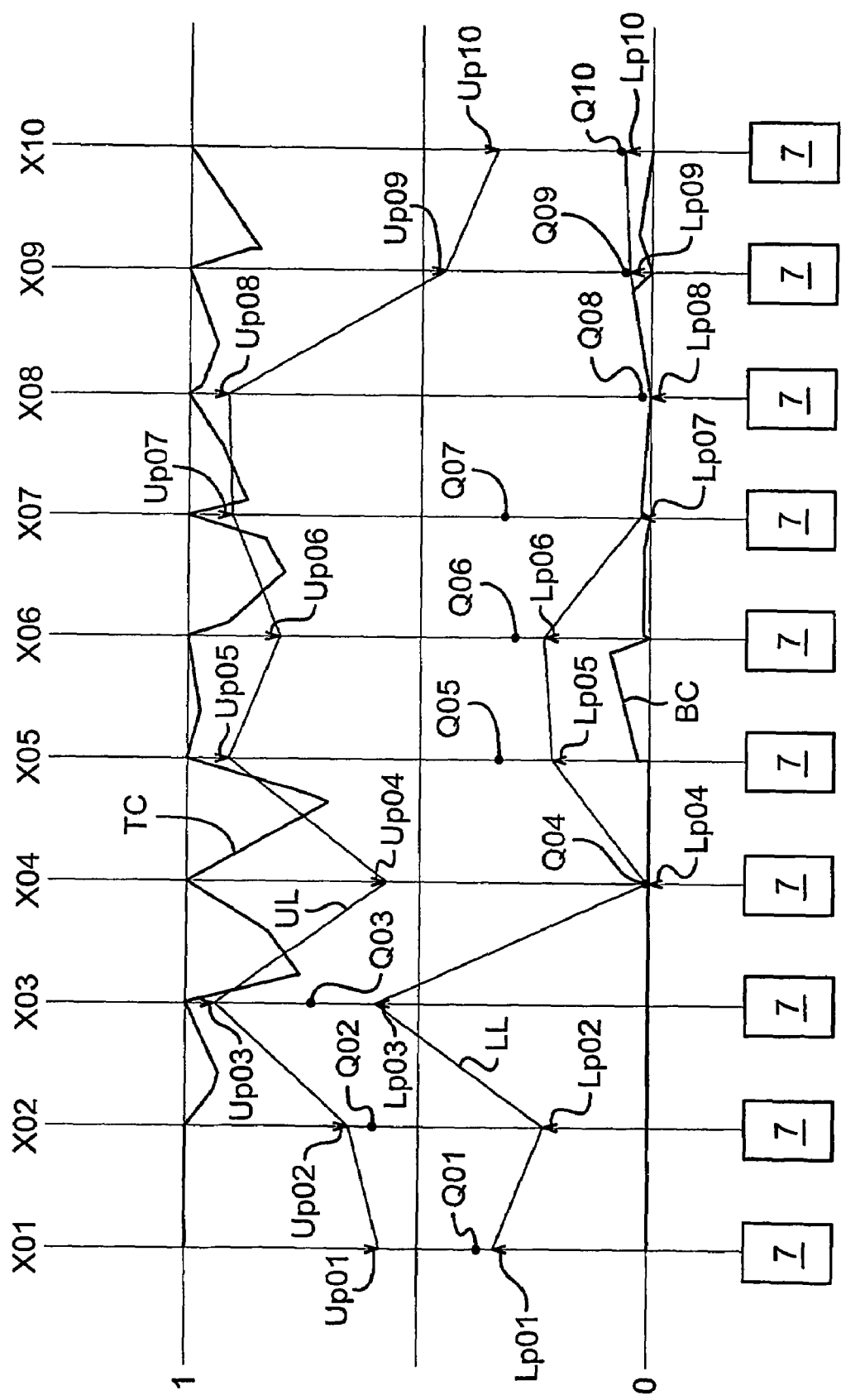
FIG. 2 is illustrative of a display representation in multi-dimensional space, provided in the system of FIG. 1.

An example of the form of display representation provided by the unit 5 is illustrated in FIG. 2.

Referring to FIG. 2, the current values Q01–Q10 of the ten variables of the first and second groups are plotted on ten equally-spaced, parallel axes X01–X10 respectively after they have been scaled to the range 0 to 1. The actual (non-scaled) values are shown digitally in graphic boxes 7 at the bottoms of those axes within the display representation. For convenience, the first three axes, X01–X03, are used for the variables of the first group, namely, those whose values Q01–Q03 are directly controllable, though it is not essential for the directly-controllable variables to be either first or consecutive.

The convex hulls applicable between the variables of adjacent axes X01–X10 are the only ones to be included in the display. Each convex hull has two parts defining upper and lower limiting boundaries of the BOZ envelope intermediate the two axes. The upper and lower hulls of the successive pairs of adjacent axes are limited to the value-range 0 to 1, and so join together to define top and bottom boundaries or chains TC and BC respectively. The display of the convex hulls, in particular of the chains TC and BC, is optional.

Each plot of the current value Q01–Q10 on its respective axis X01–X10, is accompanied by plots of the range within which that variable must remain if operation is to be kept within the BOZ. The relevant range for each variable is calculated in the unit 6 taking into account the current value of each other variable, and the upper and lower limits of the range are represented digitally, non-scaled in the box 7 of the respective axis as well by plots of carets on the axis itself. More particularly in the latter respect, the upper limits for variables of axes X1–X10 are represented by downwardly-directed carets Up01–Up10 respectively, and the lower limits by upwardly-directed carets Lp01–Lp10 respectively. For clarity, the upper carets Up01–Up10 are interconnected in the display by a polygonal line UL and the lower carets Lp01–Lp10 by a polygonal line LL.

As referred to above, the box 7 at the bottom of the axis X01–X10 of each process-variable contains the real-time digital value ('Actual') of that variable together with the digital values of the upper and lower limits ('UpLim' and 'LoLim' respectively) of its viable range. The representations within the boxes 7 at the bottoms of axes X01, X03 and X08 in the display of FIG. 2 are, for example, as given in TABLE I

TABLE I

| Axis X01 | Axis X03 | Axis X08 |
|---|---|---|
| None | None | None |
| UpLim | UpLim | UpLim |
| 168.73 | 263.34 | 4191.3 |
| Actual | Actual | Actual |
| 106.76 | 218.76 | 3196.0 |
| LoLim | LoLim | LoLim |
| 96.917 | 187.01 | 3169.5 |

The display representation provided by the unit 5 changes as the current values of the variables change during drilling. Change of value of any of the represented variables results in a corresponding change in location along the relevant axis X01–X10 of the respective value Q01–Q10 and corresponding change of the 'Actual' value in the associated box 7. In general, this change will be accompanied by relocation of the carets Up01–Up10 and Lp01–Lp10 on the axes X01–X10, and consequent changed configurations of the lines UL and LL, together with changes in the 'UpLim' and 'LoLim' values of the box 7. The unit 5 therefore provides the operator continuously with confirmation of the current operating condition, and indication of whether the current values of the variables are within the respective ranges appropriate to 'good' operation.

In the display illustrated in FIG. 2, the current-value representations Q01–Q10 are all within their respective ranges. The fact in each case that neither limit is violated is signified not only by the location of the representative plot, but is confirmed by 'None' in the associated box 7 (see Table I).

Figure 3:
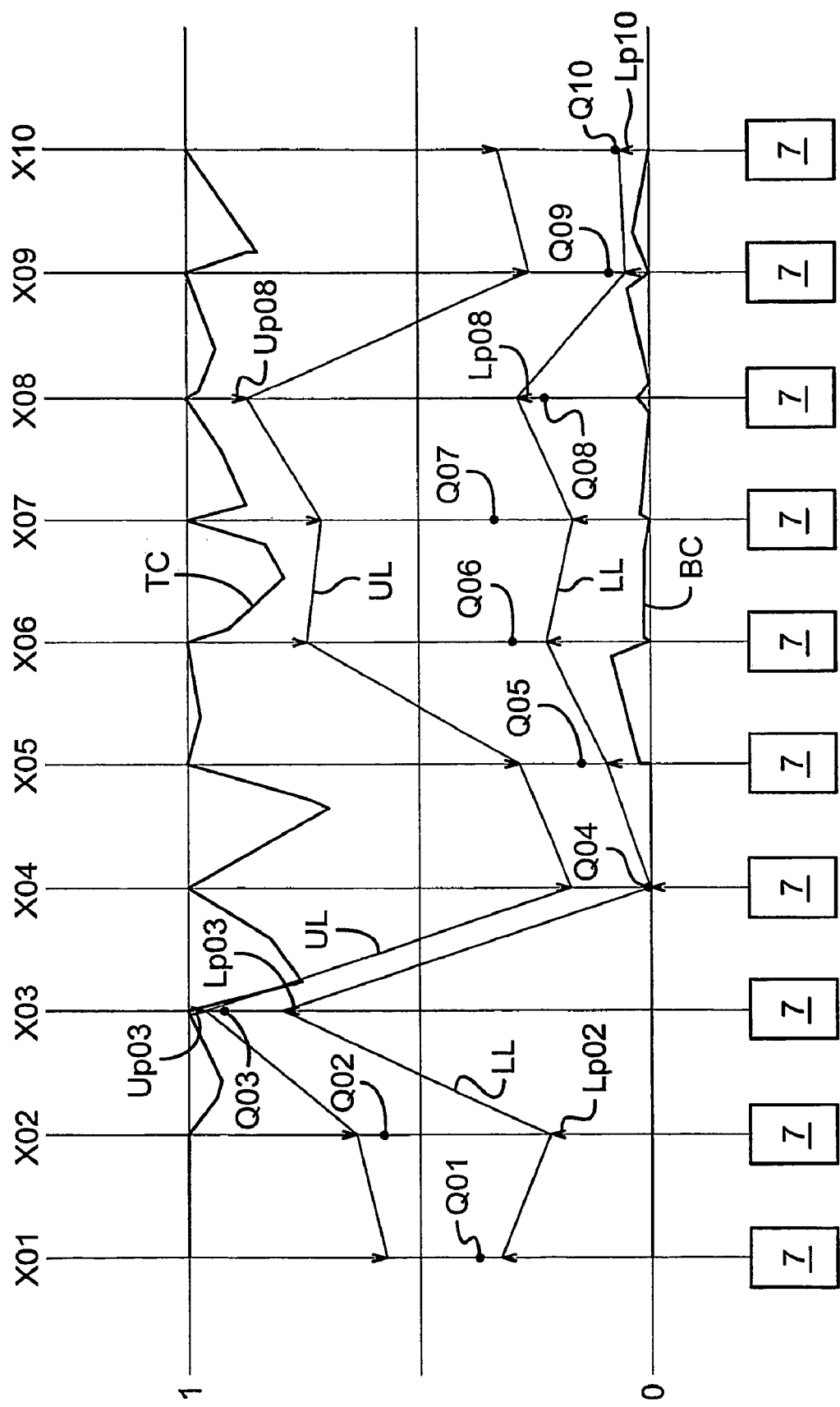
FIG. 3 is illustrative of the display representation of FIG. 2 in a subsequent phase of operation of the system of FIG. 1 leading to an alarm condition in which the value of one of the process-variables lies outside a viable range calculated for it.

FIG. 3 shows a changed condition from that of FIG. 2, in which the current value Q08 of the variable represented by the axis X08 has, owing to changes in the current values of the other variables, fallen below the lower limit represented by the caret Lp08. The unit 6 is responsive to conditions of this nature not only to signal an alarm state (by means not shown), but to indicate which limit has been violated in the box 7 to the respective axis X08, and to emphasise the relevant caret (Lp08 in this example) by enlargement and colour change. The representations within the boxes 7 at the bottoms of axes X01, X03 and X08 in the display of FIG. 3 are, for example, as given in TABLE II

TABLE II

| Axis X01 | Axis X03 | Axis X08 |
|---|---|---|
| None | None | Lower |
| UpLim | UpLim | UpLim |
| 168.16 | 269.52 | 4143.3 |
| Actual | Actual | Actual |
| 104.81 | 266.08 | 3308.0 |
| LoLim | LoLim | LoLim |
| 94.671 | 235.14 | 3378.5 |

The fact that the lower limit of axis X08 is violated is confirmed by the change from 'None' to 'Lower' in the box 7 to that axis.

As a general matter, change of value of any of the variables will result in re-definition of the upper and lower limits applicable to others of the variables, with consequential change of location of the limits Up01–Up10 and Lp01–Lp10 and lines UL and LL. Thus, the location of the value Q08 below that of the caret Lp08, can arise as in the example of FIG. 3, in consequence of change of any of the other values Q01–Q07 and Q09–Q10, without any change having occurred in the value Q08 itself, just as well as by change of that value.

Action to rectify the condition illustrated in FIG. 3 can be taken by changing the values of one or more of the controllable values Q01–Q03. Assistance with deciding which of the variables to change and to what extent is provided in the display. In this regard, the unit 5 acting in conjunction with unit 6, includes provision for simulating the effect of changing any one or more of the represented values Q01–Q03. More especially, a mouse or other pointing device (not shown) is used to identify the current value to be changed and to draw out from it (with change of colour) an image for location in a position along the relevant axis, appropriate to the tentative change of value selected.

Unit 6 then re-calculates the upper and lower limits that would apply to all the variables resulting from the tentative change or changes of value made, and generates for display new upper and lower carets Up01'–Up10' and Lp01'–Lp10' and joining lines UL' and LL', that would be applicable in the event of implementation of the change, for demarcation on the respective axes. As illustrated specifically in FIG. 4, the caret Lp08' and the line LL' are superimposed (in distinctive colours) upon the existing, current-display so that the operator can readily see what the outcome of making the tentative change of value or values would be in comparison with the current situation.

Figure 4:
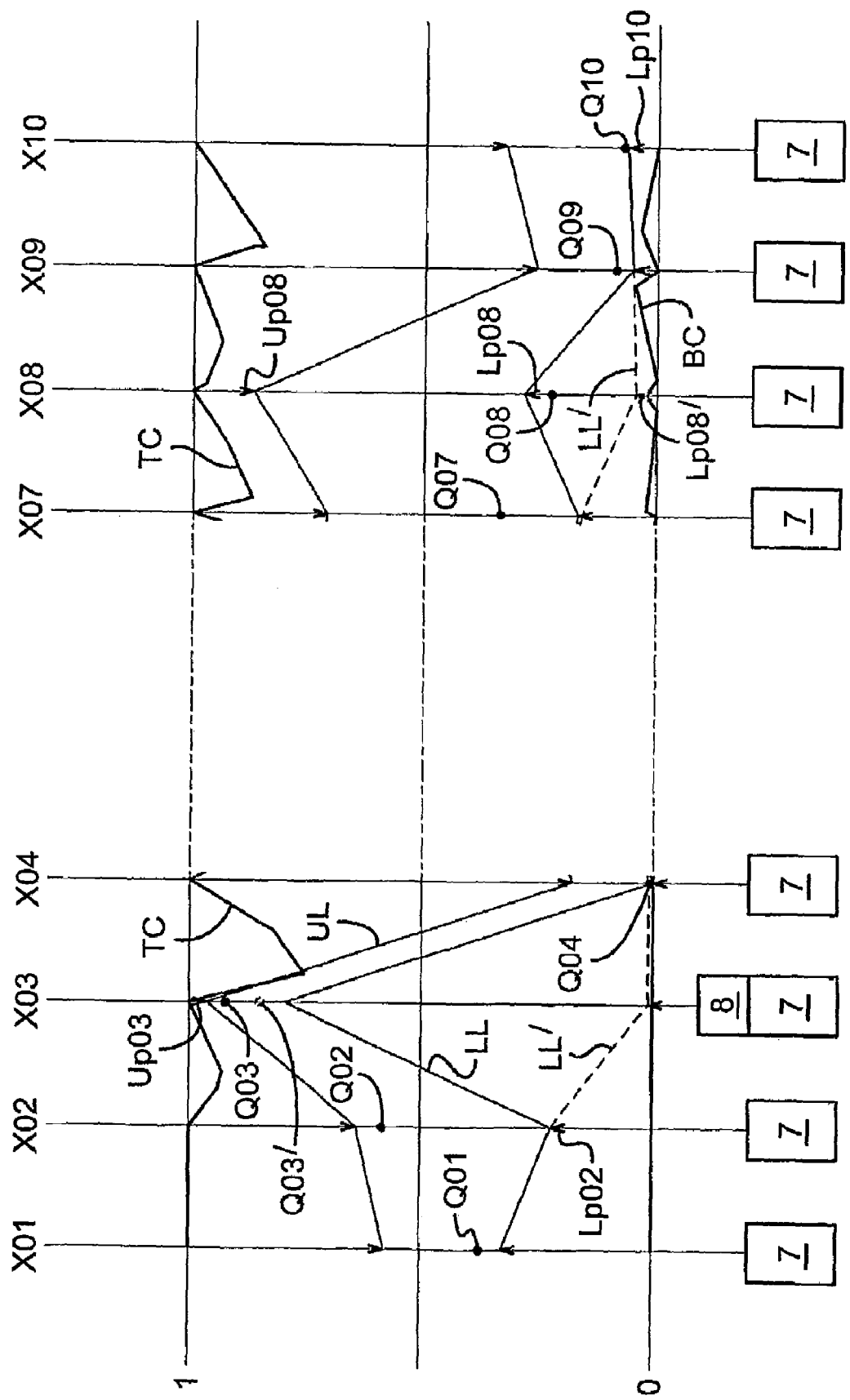
FIG. 4 is illustrative (with part omitted) of the display representation of FIG. as changed in consequence of tentative action to correct for the alarm condition.

FIG. 4 shows for the circumstances illustrated in FIG. 3, the consequence of tentative change of the value of the variable of axis X03 from Q03 to Q03'. As illustrated, the tentatively-changed value, which as well as being represented on the axis X03 as value Q03' is shown digitally in an added graphic box 8, would result in reduction of the lower limit currently represented by caret Lp08 on axis X08. The lower limit is reduced to a value that in the superimposed, tentative display, is represented by a caret Lp08'. The caret Lp08' is located below the current value Q08 of the variable, so the change if implemented, would clear the alarm.

A box 8 appears in the display representation on the axis of any of the directly-controllable variables, in the present system the variables of axes X01–X03, for which tentative change has been made. In the example represented in FIG. 4, the box 8 on the axis X03 gives indication of the actual, non-scaled value Q03' as illustrated by Table III.

TABLE III

| Axis X03 |
| --- |
| Move to |
| 260.92 |

Once the operator has determined a change of one or more of the values of axes X01–X03 that will clear the alarm, action is taken to implement the change in the drilling process, in order to bring that process back wholly within the BOZ envelope. The return to this condition is monitored by the operator and any further departure acted upon to determine tentatively the change required to correct for it.

The system may be operable in a mode in which it is responsive to an alarm condition to calculate and indicate to the operator, a recommendation of the change best suited for implementation in correcting the alarm condition.

As drilling progresses it can be expected that the rate at which alarm conditions arise will remain reasonably constant, or rise and fall gently, for some time and then show a sharp rise. A sharp rise indicates that drilling conditions (for example, geological conditions) have changed from those for which the BOZ was selected. At this point a new BOZ is constructed by selection of a new sub-set of data accumulated in the store 3; the new sub-set will include values of the real-time variables of the first and second groups, but may also include values of the first group if they are available. The sub-set selected will be that accumulated during the most-recent interval of drilling, say drilling throughout the last 10,000 feet. Any data points associated with abnormal events (for example a stuck bit) are eliminated from the sub-set before it is used to construct the new BOZ.

The decision as to when a new BOZ is to be utilised and the selection of the data for its construction and the updating of the system accordingly, may be carried out by the drilling engineer. However, the operator of the display system may identify the need for a new BOZ and initiate automated selection of the relevant data, construction of the new BOZ from it, and updating of the system. Alternatively, the system may operate entirely automatically to initiate, select, construct and update the system with a new BOZ.

Although the multi-dimensional display representation provided by the unit 5 has been illustrated and described above in the context of vertical, parallel axes, the unit 5 may be arranged to provide it selectively in this vertical form or with the axes horizontal. Furthermore, the unit 5 may also, or alternatively, be arranged to provide the display representation in a polar form with radial axes. A polar-form of display representation is illustrated in FIG. 5.

Figure 5:
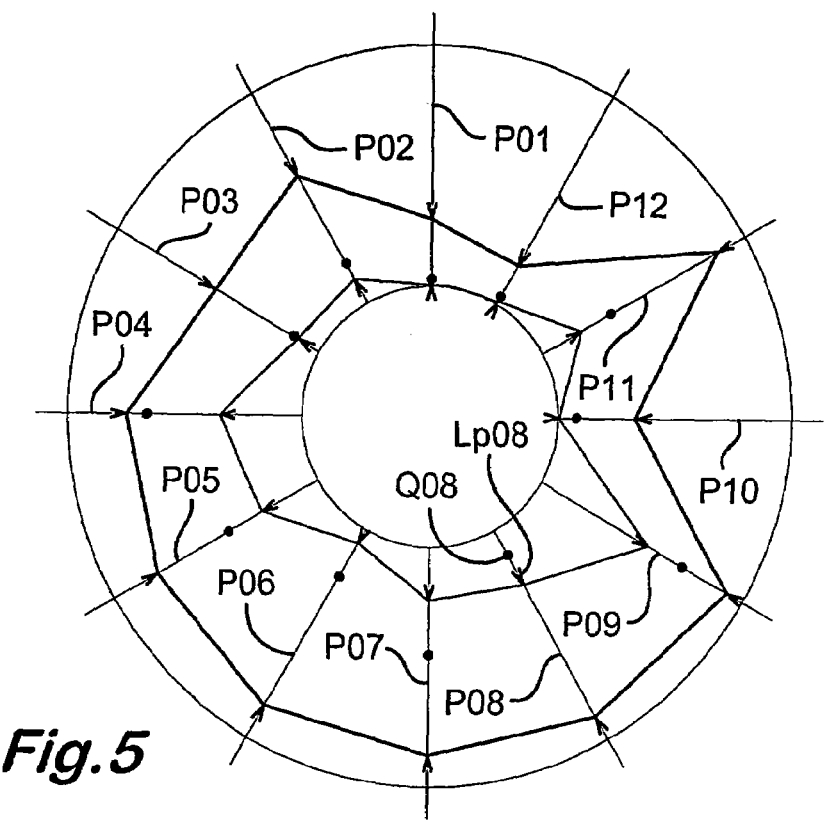
FIG. 5 is illustrative of an alternative form of display representation to that shown in FIG. 2. for use in the system of FIG. 1.

Referring to FIG. 5 twelve axes P01–P12 are in this case used, and the existence of an alarm condition in which the current value Q08 of the variable of axis P08 violates the lower limit Lp08 of that axis, is illustrated.

Figure 6:
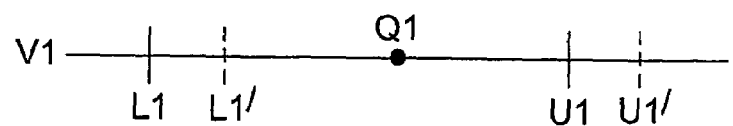
FIG. 6 is illustrative of yet another alternative form of display representation to that shown in FIG. 2, for use in the system of FIG. 1.
Figure 6:
Figure 6:
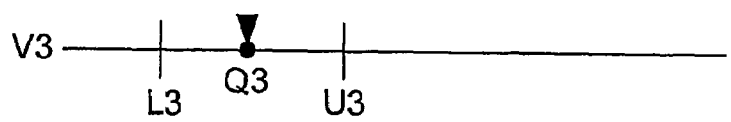
Figure 6:
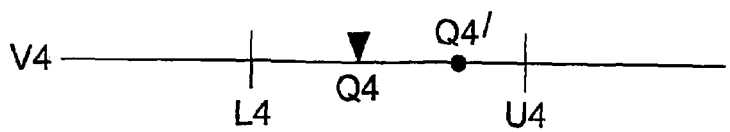

A further alternative form of display is illustrated in FIG. 6. In this, each of the real-time or on-line variables V1–V4, is represented by a horizontal bar (the bars might instead be vertical). The current values Q1–Q4 of the variables V1–V4 are each indicated by a symbol spaced along the bar according to its magnitude; a dot is used for the symbol in this case but an open-centred circle may be used as an alternative. Furthermore, according to this example, a triangular symbol is added to the dot symbol in each case where the variable is directly controllable, and upper and lower limits U and L respectively, of the variables are indicated by cross-bars. In the example illustrated, the upper limit U2 of the variable V2 is violated.

When the operator moves the current-value symbol of one of the controllable variables for tentative investigation of the effect of the change on the limits of the other variables, the triangular symbol of the moved variable remains fixed in the location appropriate to its current-value. Thus, in the case illustrated where there is tentative change of the value of the variable V4, to Q4', the triangular symbol for that variable remains in the location appropriate to the current-value Q4. The effect on the limits for each variable V1 and V2 is illustrated in the example of FIG. 6, by distinctive upper-limit cross-bars L1' and L2' and distinctive lower-limit cross-bars U1' and U2'; the change would have the desirable effect of correcting the condition in which the value Q2 of the variable V2 violates the upper limit U2.

The invention claimed is:

1. A method of operating a controllable multi-variable well- or shaft-drilling process, comprising steps of;
deriving a multi-dimensional display representation of drilling process variables of the drilling process according to individual coordinate axes;
defining one of bounds or envelopes for prospective operation of the drilling process, said bounds or envelopes being defined in accordance with sets of values for drilling process variables accumulated respectively from previous multiple operations of the drilling process;
indicating current values of the drilling process variables on respective axes of the display representation, the current values of the drilling process variables comprising real-time values of the drilling process variables, and one or more of the drilling process variables being drilling process variables that are directly controllable in performance of the drilling operation;
calculating for each drilling process variable according to current values of other drilling process variables, a viable range of values for that individual drilling process variable consistent with operation of the drilling process within said bounds or envelopes;
demarcating the calculated viable ranges of the drilling process variables on their respective axes of the display representation;
detecting a condition in which the current value of any said drilling process variable is outside a viable range calculated for that drilling process variable;
responding to said condition to adjust the value of one or more of the directly controllable drilling process variables towards maintaining the current values of all said variables within their respective viable ranges; and
wherein the accumulated sets of values used for defining the one of bounds or envelopes, are changed during course of operation of the process for other sets of values for the drilling process variables accumulated respectively from the previous multiple operations of the drilling process, accumulated sets of values used for defining the one of bounds or envelopes being changed for other sets of values in dependence upon the rate at which the condition is detected.

2. The method according to claim 1 wherein the bounds or envelopes are convex hulls calculated for respective pairs of the drilling process variables using the values accumulated for them in said sets.

3. The method according to claim 2 wherein the convex hulls for the pairs of drilling process variables of adjacent axes of the multi-dimensional display representation are indicated in the display representation.

4. The method according to claim 1 wherein the axes of the multi-dimensional display representation are parallel to one another.

5. The method according to claim 1 wherein the axes of the multi-dimensional display representation are angularly spaced from one another.

6. The method according to claim 1 wherein the demarcation of the calculated viable range for each drilling process variable is by indicators of upper and lower values respectively of the viable range on the axis of that drilling process variable in the display representation.

7. The method according to claim 6 wherein adjustment of the value of one or more of the directly controllable drilling process variables towards maintaining the current values of all said drilling process variables within their respective viable ranges, includes a preliminary step of tentative adjustment within the display representation of the values of the one or more drilling process variables from the current values thereof and calculation of the viable ranges that would apply to the respective drilling process variables if that adjustment were made.

8. The method according to claim 7 wherein the viable range that would apply to each drilling process variable if the adjustment were made is demarcated on an axis of that drilling process variable in the display representation.

9. A system for use in operation of a controllable multi-variable well- or shaft-drilling process, comprising means for deriving a multi-dimensional display representation of drilling process variables of the process according to individual coordinate axes, means for defining one of bounds or envelopes for prospective operation of the drilling process, said one of bounds or envelopes being defined in accordance with sets of values for drilling process variables accumulated respectively from previous multiple operations of the process, means responsive to input signals in accordance with current values of the drilling process variables for indicating current values of the drilling process variables on respective axes of the display representation, the current values of the drilling process variables being real-time values of the drilling process variables and at least some of the drilling process variables being drilling process variables that are directly controllable in performance of the drilling process, calculating means for calculating, for each drilling process variable according to the current values of other drilling process variables, a viable range of values for that individual drilling process variable consistent with operation of the drilling process within said bounds or envelopes, the calculated viable ranges of the drilling process variables being demarcated on respective axes of the display representation, and means operable for defining tentative change from the current values of a selected one or more of the drilling process variables, said calculating means being responsive to the tentative change so defined for calculating the viable ranges as aforesaid that would be applicable in the event of implementation of said change, for demarcation on the respective axes, and wherein the system further comprises means for detecting a condition in which the current value of any said drilling process variable is outside the viable range calculated for the drilling process variable, and means responsive to the rate of occurrence of the condition for changing the sets of values defining the one of bounds or envelopes during course of operation of the drilling process for other sets of values for the drilling process variables accumulated respectively from the previous multiple operations of the drilling process.

10. The system according to claim 9 wherein the one of bounds or envelopes are convex hulls calculated for respective pairs of the drilling process variables using the values accumulated for them in said sets.

11. The system according to claim 10 wherein the convex hulls for the pairs of drilling process variables of adjacent axes of the multi-dimensional display representation are indicated in the display representation.

12. The system according to claim 9 wherein the axes of the multi-dimensional display representation are parallel to one another.

13. The system according to claim 9 wherein the axes of the multi-dimensional display representation are angularly spaced from one another.

14. The system according to claim 9 wherein the demarcation of the calculated viable range for each drilling process variable is by indicators of upper and lower values respectively of that range on the axis of that drilling process variable in the display representation.

* * * * *